United States Patent [19]
Rasmussen et al.

[11] Patent Number: 5,850,619
[45] Date of Patent: Dec. 15, 1998

[54] FROZEN PRECIPITATION ACCUMLATION ALERT SYSTEM

[75] Inventors: Roy Martin Rasmussen; Wayne Michael Adams, both of Boulder; Jeff Alan Cole, Louisville; Frank William Hage; Charles Geoffery Wade, both of Boulder, all of Colo.

[73] Assignee: University Corporation for Atmospheric Research, Boulder, Colo.

[21] Appl. No.: 749,508

[22] Filed: Nov. 15, 1996

[51] Int. Cl.$^6$ .................................................. G06F 19/00
[52] U.S. Cl. ................................................. 702/3; 342/26
[58] Field of Search ........................... 703/3, 4; 342/26, 342/460

[56]        References Cited
       U.S. PATENT DOCUMENTS

| | | | |
|---|---|---|---|
| 5,028,929 | 7/1991 | Sand et al. | 342/26 |
| 5,379,215 | 1/1995 | Kruhoeffer et al. | 342/26 |
| 5,406,481 | 4/1995 | Shinozawa et al. | 702/3 |
| 5,440,483 | 8/1995 | Badoche-Jacquet et al. | 702/3 |
| 5,517,193 | 5/1996 | Allison et al. | 342/26 |
| 5,528,493 | 6/1996 | Potter | 702/3 |
| 5,583,972 | 12/1996 | Miller | 342/26 |

*Primary Examiner*—Donald E. McElheny, Jr.
*Attorney, Agent, or Firm*—Duft, Garziano & Forest, P.C.

[57]        ABSTRACT

A frozen precipitation accumulation alert system for a target area wherein the system comprises a means and apparatus for measuring at least one meteorological indicator in at least one measurement location proximate to the target area, detecting meteorological structure using radar data from a weather radar over a region that includes the target area, and determining a precipitation accumulation forecast based the meteorological structure and at least one meteorological indicator. The system further includes a means and apparatus for quantifying a precipitation rate of frozen precipitation over time wherein the precipitation rate is one of the meteorological indicators, and generating a view of user selected ones of the meteorological indicators, the meteorological structure, and the precipitation accumulation forecast.

25 Claims, 4 Drawing Sheets

FROZEN PRECIPITATION ACCUMLATION ALERT SYSTEM

FIELD OF THE INVENTION

This invention relates to the field of winter aviation hazards, and more particularly to a system that detects and/or forecasts dangerous accumulations of frozen precipitation within a target area on the Earth's surface so that persons interested in the target area can be notified of the need or potential need to remove frozen precipitation from objects on the Earth's surface within the target area.

PROBLEM

The accumulation of frozen precipitation on an aircraft prior to takeoff is a significant factor contributing to the loss of lift and the increase in drag during the vulnerable moments of takeoff. Loss of lift and/or increased drag during aircraft takeoff have been factors in at least 10 commercial airline takeoff accidents in recent decades. For example, the accumulation of as little as 0.8 mm of ice on the upper wing surface of an aircraft can result in about a 25% loss of lift during takeoff. Frozen precipitation in the context of the present discussion includes, but is not limited to, snow, ice, frost, sleet, freezing rain, and a mixture of frozen and liquid precipitation.

Existing techniques for detecting an accumulation of frozen precipitation in a target area and determining the need to remove frozen precipitation from objects in the target area rely heavily on visual inspections of the objects and the local weather conditions.

For example at an airport, an air traffic controller may decide to hold aircraft at the gate of an airport terminal based on a regional National Weather Service (NWS) weather forecast in combination with local temperature readings, outside visibility estimates, and informal on-site weather reports from other airport personnel around the airport. Similarly, an airport manager may decide to clear a runway or begin or postpone de-icing and/or anti-icing operations based on the same regional NWS weather forecast, local temperature readings, outside visibility estimates, and informal on-site weather reports. Finally, a flight crew may request aircraft de-icing and ground crews may initiate de-icing or runway clearing based only on weather visibility and/or a visual inspection of the objects themselves. However, making safety decisions based on a regional NWS weather forecast, a local temperature reading, and an outside visibility estimate, is too subjective and potentially misleading for the level of safety required of modern commercial aviation.

One problem with making informed decisions to remove frozen precipitation from objects such as runways and grounded aircraft at an airport, is the lack of accurate meteorological indicators of frozen precipitation in the immediate airport target area. This is a particular problem for today's sprawling commercial airports if the meteorological sensors on which a regional NWS forecast is based are located outside the immediate airport target area or only in a remote part of the airport target area. A winter storm front near an airport can create distinctly different and dangerous weather conditions for a runway at one end of an airport than for another runway at an opposite end of the airport.

Another problem is that an outside visibility estimate during a frozen precipitation event is at best only a subjective measure of visibility and accumulation, and is a decidedly poor measure of the precipitation rate. Unfortunately, the present standard by which decisions are made by airport personnel to remove frozen precipitation from runways and aircraft is based primarily on NWS visibility categories of light (S−), moderate (S), and heavy (S+) precipitation. These NWS visibility categories are unreliable because small snowflakes or ice crystals often create an illusion of light precipitation and large snowflakes or ice crystals often give the illusion of heavy precipitation, and the density of the frozen precipitation cannot be determined by casual observation. Meteorological data available from the time of major commercial airline takeoff accidents indicates that visibility varied widely from good to poor although the precipitation rates during each accident were consistently high up to or about 2 to 2.54 mm/hr. Thus, the wide variability in visibility at the time of each commercial airline accident versus the consistently high precipitation rates for each accident suggests that the present NWS visibility categories are unreliable for purposes of determining the need to remove frozen precipitation from runways and aircraft. Part of the reason for the wide variability in visibility for a given frozen precipitation rate is the observed order of magnitude variation in crystal density for a given snowflake size. Since visibility reduction due to a snowflake is proportional to the area of the snowflake and not the density of the snowflake, wide variations in precipitation rates are possible for a given snowflake size due to variations in snowflake density. Further, surface temperature cannot be used as a reliable surrogate for snowflake density because snowflake density depends on the crystal type which is a function of in-loud temperature and supersaturation at the location where the crystal was formed, the degree of rimming which is a function of the mass concentration of cloud droplets that the crystal encountered during its fall to the surface, and the degree of crystal aggregation which is a function of ice crystal concentration aloft in conjunction with the presence of dendritic crystals and the closeness to the 0° C. isotherm. Without prior knowledge of the above factors the precipitation rate of frozen precipitation is impossible for an observer to determine yet it is a significant factor contributing to aircraft takeoff accidents.

Another problem is the conflict between commercial aviation economics versus passenger safety. Failure to de-ice or anti-ice an aircraft, or the result of exceeding the hold-over time following de-icing or anti-icing operations, can contribute to the likelihood of an aircraft takeoff accident. For this reason alone, the airline customer expects that any trace of frozen precipitation should be removed from runways and aircraft as often as possible prior to every flight during a winter storm. On the other hand, unnecessarily de-icing or anti-icing a single aircraft can cost thousands of dollars in wasted materials and schedule delays. Further, unnecessarily closing a runway for clearing, de-icing and/or anti-icing can cost tens of thousands of dollars to the airport, and airlines using the airport, due to schedule delays and/or flight cancellations nation wide for domestic flights alone. Therefore there is a strong economic and safety incentive for more accurate and reliable meteorological indicators so that airport personnel can decide when or if frozen precipitation must be removed without compromising safety.

For these reasons it is a problem to provide airport personnel with highly accurate, localized, real-time, 0–30 minute meteorological reports and forecasts for use in identifying a dangerous accumulation of frozen precipitation within an airport target area. A solution to this problem has heretofore not been realized prior to the invention disclosed below.

SOLUTION

The above identified problems are solved and an advance achieved in the field by the frozen precipitation accumulation alert system of the present invention. The frozen precipitation accumulation system detects and/or forecasts a dangerous accumulation of frozen precipitation within a target area on the Earth's surface and alerts users interested in the target area of the likelihood that removal of the frozen precipitation accumulation may be required for objects within the target area. The decision to act on the alert remains with the user.

The frozen precipitation accumulation alert system comprises a method and apparatus for measuring at least one meteorological indicator in at least one measurement location proximate to the target area, detecting meteorological structure by radar data from a meteorological radar over a region that includes the target area, determining a surface accumulation forecast based on meteorological structure and at least one of the meteorological indicators, and determining a surface accumulation alert based on the surface accumulation forecast. The measuring of at least one meteorological indicator includes a method and apparatus for quantifying a precipitation rate of frozen precipitation over time wherein the precipitation rate is one of the meteorological indicators. The system also includes a method and apparatus for generating a view in human readable graphic form indicative of the target area and user selected ones of the meteorological indicators, the meteorological structure, and the surface accumulation forecast.

DETAILED DESCRIPTION

Figure 1:
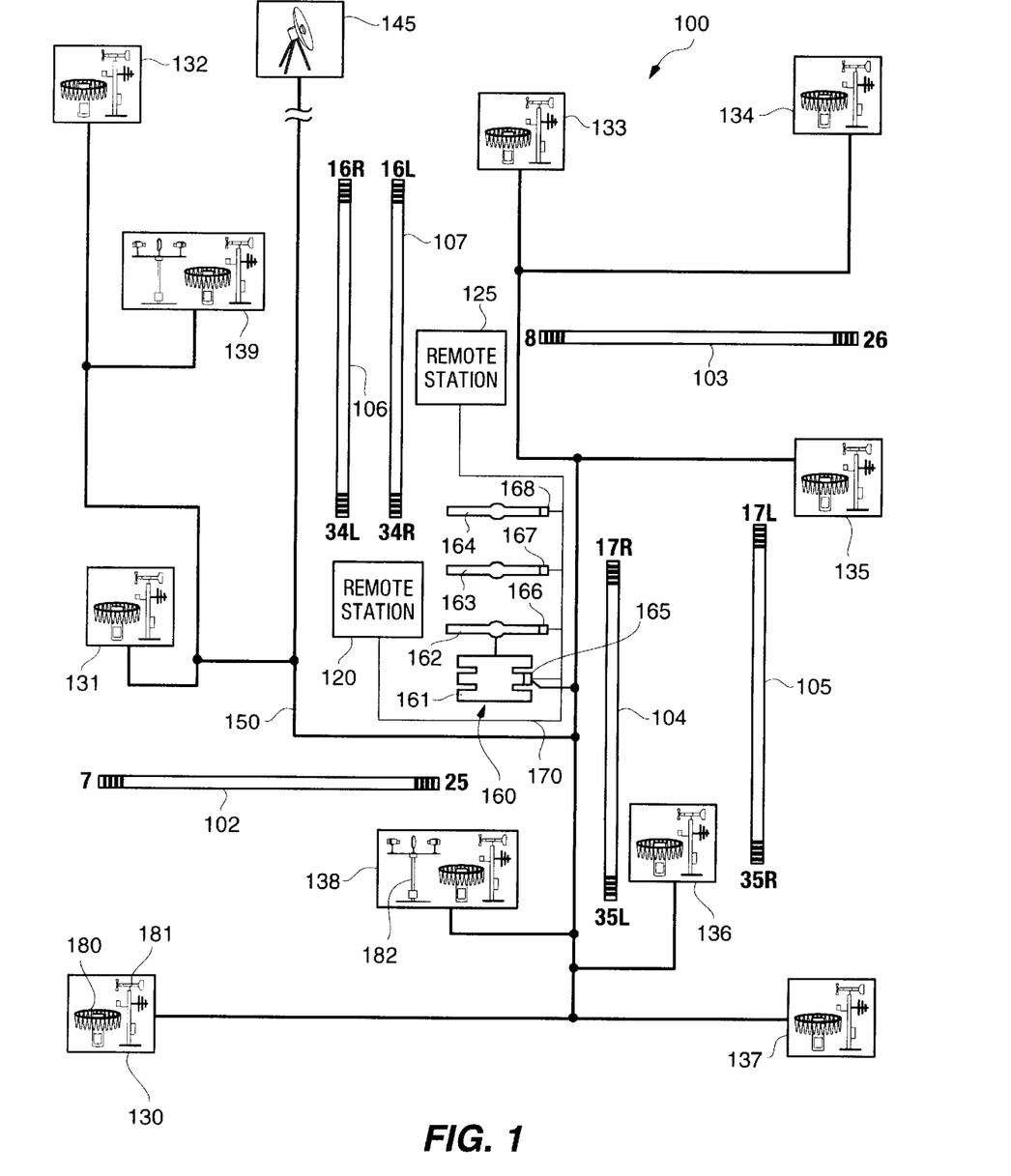
FIG. 1 illustrates an airport configuration with a frozen precipitation accumulation alert system in block diagram form.

Airport Configuration Layout—FIG. 1

FIG. 1 illustrates an airport configuration referred to herein as target area 100. This and any other configuration illustration and any accompanying discussion are for purposes of example only and are not limitations on the use or ability of the frozen precipitation accumulation alert system.

Target area 100 includes east-west runways 102–103, north-south runways 104–107, and an airport terminal complex 160. Airport terminal complex 160 includes a main terminal 161 and remote terminals 162–164. The size of target area 100 includes tens to hundreds of square kilometers although there are no limits or requirements for the size of a target area.

Sensor stations 130–139 are located proximate to and throughout target area 100 for the purpose of measuring real-time meteorological conditions at the Earth's surface within the target area. The community of sensor stations 130–139 are commonly referred to as a sensor grid although the sensors need not be in any specific grid configuration. Each of the sensor stations 130–139 are interconnected by a first communications carrier 150 to a processing station 165 in the main terminal 161. The location of processing station 165 can be anywhere within or outside of target area 100.

A sensor station includes at least a precipitation gauge such as snow gauge 180 which measures the liquid equivalent of frozen precipitation accumulation. An anemometer and wind vane combination, such as anemometer 181, typically accompanies each snow gauge to measure wind speed and wind direction. Similarly, a thermometer, hygrometer, and/or barometer are also typically located at each sensor station to measure temperature, pressure, and humidity. The set of measurements including, but not limited to, temperature, pressure, humidity, wind speed, wind direction, and precipitation accumulation are more generically referred to as meteorological indicators.

A snow gauge is key meteorological indicator for the frozen precipitation accumulation alert system. A snow gauge is an apparatus designed to measure the liquid-equivalent accumulation of precipitation in winter conditions. Precipitation accumulates in a container or bucket in the snow gauge at the same rate and in the same quantity as the precipitation falling in the immediate area. The accumulation container is charged with an anti-freeze solution such as ethylene glycol or a mixture of glycol and methanol, or any similarly functioning solution, to dissolve the solid precipitation and prevent freezing of the liquid contents. A layer of oil helps retard evaporation from the solution. The weight of the accumulated precipitation is converted into a corresponding depth with resolutions at or about 0.2 mm or less. A shielding apparatus may be necessary to reduce air-flow distortion around the orifice of the snow gauge and to optimize the sampling potential for the snow gauge. Types of snow gauges available in the industry include, but are not limited to, the Universal gauge by Belfort, and the ETI gauge by Environmental Test Instruments. The Universal gauge is the preferred snow gauge and the gauge used by the NWS. Shielding apparatus includes, but is not limited to, the Nipher shield by the Canadian Weather Service, the Alter shield by the NWS, and the Wyoming shield by the University of Wyoming.

Additional meteorological sensing apparatus at each sensing station can include, but is not limited to, a visibility gauge 182 as illustrated in meteorological sensor stations 138–139. Visibility gauge 182 uses a laser sensor facing a focusing hoop to provide quantitative visibility feedback from either of the sensor stations 138–139.

The number of sensor stations required for a target area is a function of the size of the target area, the level of meteorological resolution desired, and the existence of any object within the target area requiring special attention. For target area 100, runways 103–107 are important objects that require well thought out sensor station placements adjacent to the runways because the amount of frozen precipitation accumulating on or near a runway can reflect a dangerous accumulation of frozen precipitation on aircraft in the immediate area waiting to use the runway. Sensor locations near preferred takeoff taxi routes are also desirable and provide highly relevant information for de-icing crews. Also, locating sensors in at least one position upstream from the prevailing winter storm patterns relative to target area 100, can provide highly relevant information regarding approaching precipitation. Generally, the more sensor stations that are placed within a target area the better the resulting meteorological resolution. However, a minimum of three sensor stations are needed to generate adequate accumulation information. For the purposes of this discussion any reference to a sensor station means a sensor station that at least includes a snow gauge and typically also an anemometer and wind vane.

At least one weather radar 145 is positioned to provide radar coverage of target area 100. The location of weather radar 145 is typically a remote location far enough from target area 100 so that one radar can sweep the entire target area. Weather radar 145 is used to detect and track atmospheric structure at elevations less than or about 1 km that directly influence surface conditions in and around target area 100. A NExt generation RADar (NEXRAD) is a typical weather radar used to collect data indicative of atmospheric structure at 1 km or less elevations. Weather radar 145 collects radar data on a beam by beam basis across target area 100 to reveal meteorological structure that is approaching or retreating from target area 100. Meteorological structure is revealed when the radar signal is reflected off the meteorological structure. The reflected signal is captured by the receiving antenna of weather radar 145 as radar data, also known as radio signal reflectivity data. Reflectivity data can be used by itself for the identification of meteorological structure alone or as part of a Z-S relationship calculation where Z is the radar reflectivity factor and S is a snowfall or frozen precipitation rate as determined by a snow gauge. The Z-S relationship is used to determine a projection of future radar reflectivity values using storm-tracking techniques that determine precipitation rate forecasts. More specifically, the Z-S relationship is $Z=aS^b$, where a and b are determined through regression fits to the data.

Standard storm-tracking systems available in the industry include, but are not limited to, a winter storm version of the Thunderstorm Identification, Tracking, Analysis, and Nowcasting (TITAN) system by the National Center for Atmospheric Research (NCAR) in Boulder, Color., TREC, and the Radar Echo Prediction (REP) system by NCAR.

Temperature is another important meteorological indicator factored by the frozen precipitation accumulation alert system. The temperatures observed during commercial aircraft takeoff accidents were quite warm in the range from about 25° F. to 31° F. For this reason temperature readings at each sensor station 130–139 across target area 100 are important.

Wind enhanced precipitation accumulation is another important meteorological indicator factored by the frozen precipitation accumulation alert system. Since the accumulation of frozen precipitation on a surface is determined by the component of the precipitation's motion perpendicular to a surface, the mass flux of frozen precipitation to a surface is written as:

$$\text{MassFlux} = P_s = IWC \cdot V_T \qquad (1)$$

$$= IWC(V_T\cos(\theta) + Hwspd \cdot \sin(\theta)) \qquad (2)$$

where in P is the liquid equivalent precipitation rate, IWC is the ice water content of the frozen precipitation, V is the average terminal velocity of the frozen precipitation, and Hwspd is the horizontal wind speed. Equation (2) factors the perpendicular component of both the frozen precipitation terminal velocity average V and the horizontal wind speed Hwspd for a mass flux to a surface oriented at angle θ to the horizontal. If the surface is oriented horizontally, then equation (2) indicates that the mass flux equals the IWC of the frozen precipitation times V. However, if the surface is inclined from the horizontal as is the case for an aircraft wing, then the horizontal wind increases the mass flux of snow to the inclined surface by a factor proportional to sin(θ) times the wind speed. For a typical aircraft wing, θ is about 10° and results in the following equation for a liquid equivalent precipitation rate:

$$P_S = IWC \cdot (0.985 V_T + 0.174 \cdot Hwspd) \qquad (3)$$

Equation (4) illustrates the enhancement factor over the accumulation on a horizontal surface which is only a function of the horizontal wind speed Hwspd, the frozen precipitation terminal velocity average $V_t$ and the angle θ.

$$E_f = P_S(\theta)/P_S(\theta = 0) = \cos(\theta) + \sin(\theta) \cdot \left( \frac{Hwsp}{V_T} \right) \qquad (4)$$

Processing station 165 in main terminal 161 connects sensor stations 130–139 and weather radar 145 by way of first communications carrier 150. Processing station 165 also connects monitoring stations 120, 125, 166–168 by way of a second communications carrier 170. Depending on the airport terminal configuration one of the monitoring stations 166–168 may be an airport control tower and processing station 165 may include a monitoring station or have a monitoring station located elsewhere within main terminal 161.

One of the monitoring stations 166–168 may be used by an airport manager to monitor precipitation accumulation status and oversee aircraft de-icing and runway clearing operations. Other of the monitoring stations 166–168 may be used by ground crews at gates in remote terminals 162–164 to determine the need to de-ice or anti-ice aircraft at the gate. Although de-icing or anti-icing at the gate is not the only or last opportunity to remove frozen precipitation from an aircraft, gate de-icing or anti-icing is common at many airports that lack remote de-icing and anti-icing stations near takeoff runways. De-icing is the processes of applying a Type I chemical to the exterior of aircraft to remove frozen precipitation therefrom. Anti-icing is the process of applying a Type II chemical to the exterior of aircraft to prevent frozen precipitation from accumulating thereon.

Ground crews at remote monitoring stations 120 and 125 also monitor meteorological indicators from the frozen precipitation accumulation alert system to determine the need to de-ice or anti-ice aircraft immediately prior to aircraft takeoff. Remote de-icing stations 120 and 125 are located at the beginning of takeoff runways 103 and 106–107. Positioning the remote de-icing stations at the beginning of a runway is useful because a previously de-iced aircraft may have been away from its terminal gate from tens of minutes to more than an hour prior to being cleared for takeoff. Depending on the amount of time and the precipitation rate since the most recent de-icing operation on the aircraft, a safe holdover time for a present precipitation rate may have been exceeded thereby creating a serious safety hazard for the aircraft and its passengers. Without a remote de-icing station an aircraft that has exceeded its holdover time would have to return to the terminal gate for additional de-icing thereby creating further airline scheduling delays. In general, airport personnel use the precipitation accumulation total, the present precipitation rate, and projected precipitation total and accumulation rates in the next 0–30 minutes, to coordinate removing accumulated precipitation from runways and the de-icing and/or anti-icing operations. More precisely, it is the liquid equivalent of frozen precipitation accumulation that provides the most accurate meteorological indicator for the frozen precipitation accumulation alert system.

The number of snow gauges and availability of additional meteorological sensing apparatus and techniques are directly related to the size of the target area covered, the quality of data gathered from the sensor grid, and the ability of the system to report real time and/or forecasted weather information. Table I illustrates the relationships between sensors, target area, and resulting reports.

TABLE 1

| System Components | Scope of System | Resulting Report |
|---|---|---|
| <3 snowgauges | Discrete points only | Real time view |
| ≧3 snowgauges | Full target area | Real time view |
| ≧3 snowgauges and radar | Full target area | Real time qualitative view |
| ≧3 snowgauges, radar, and Z-S | Full target area | Real time quantitative view |
| ≧3 snowgauges, radar, Z-S, and tracking algorithms | Full target area | Real time and full forecast quantitative view |

Referring to Table I above, a sensor grid having less than 3 snow gauges can only provide real-time accumulation data for discrete points only rather than for an entire target area. Alternatively, a sensor grid having at least 3 snow gauges can provide real-time accumulation data for a target area because the snow gauges can at least be triangulated within the target area. Therefore, at least 3 snow gauges is a critical threshold number of sensor stations for providing any useful alert system data.

Adding a weather radar to a sensor grid is a critical threshold for providing more robust data for the alert system. Having at least 3 snow gauges in a sensor grid in combination with a weather radar can provide a real-time qualitative view of a target area. Similarly, having at least 3 snow gauges in a sensor grid in combination with a weather radar and a Z-S relationship calculation, can provide a real-time quantitative view of a target area. Finally, 3 snow gauges in a sensor grid, a weather radar, a Z-S relationship calculation, and storm tracking systems can provide a real-time and full forecasted quantitative view of a target area.

Figure 2:
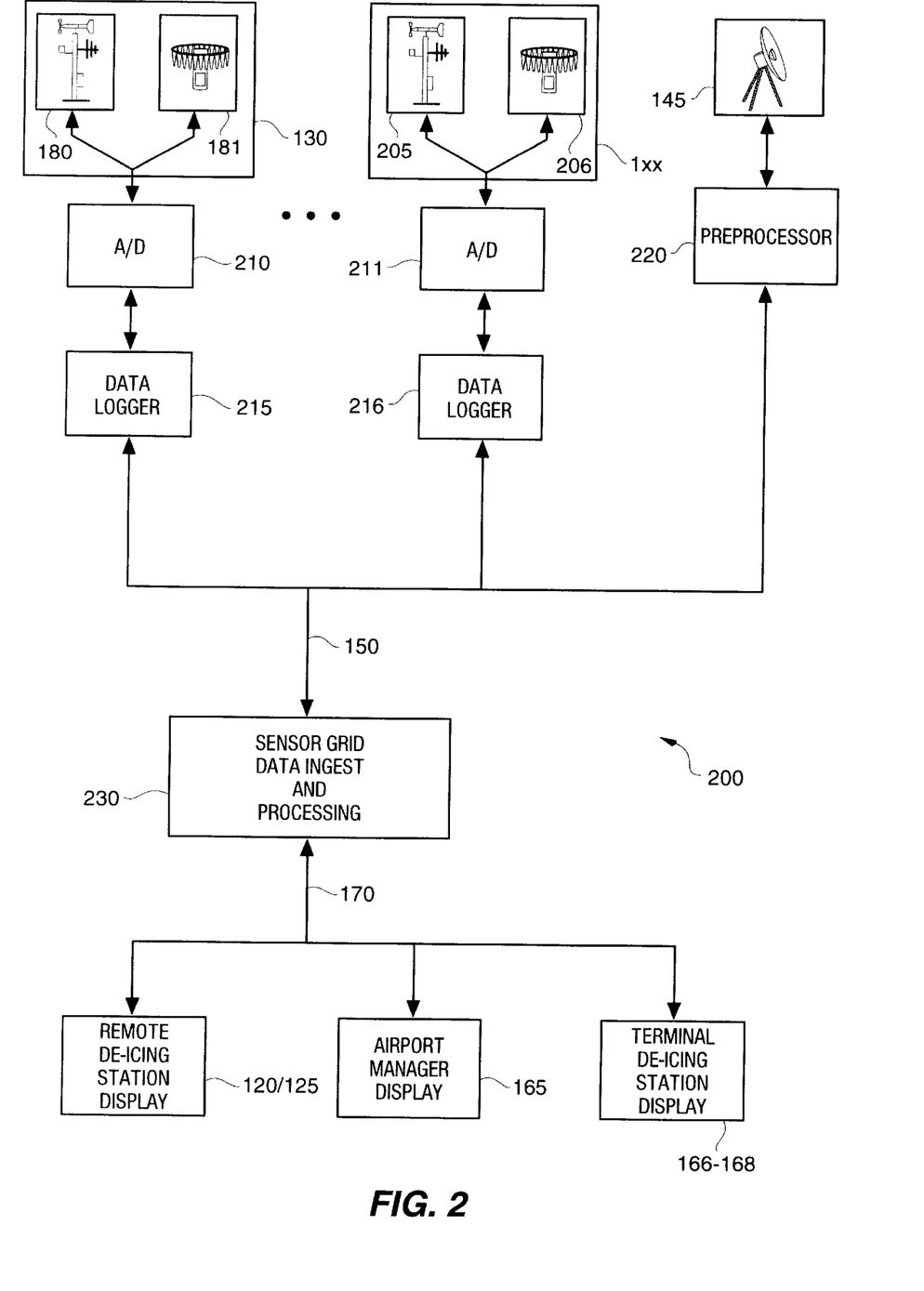
FIG. 2 illustrates system connectivity for the frozen precipitation accumulation alert system in block diagram form.

System Connectivity—FIG. 2

FIG. 2 illustrates system connectivity for the frozen precipitation accumulation alert system in block diagram form. For purposes of illustration there are n independent and continuously operating sensor stations 130-1xx represented in FIG. 2. Data from sensors 180–181 through 205–206 in sensor stations 130 through 1xx is input in analog form to respective analog to digital converters 210 through 211. The digitized data from analog to digital converters 210–211 is input to respective data loggers 215 through 216 to time and date stamp the data, encode sensor identification for the sensor station from which the data originated, and record the data. A data logger is a Personal Computer (PC) based computing device or an equivalent device capable of operating independently in the manner described herein. In the preferred embodiment a data logger is an Intel based PC running a UNIX operating system and storing data as an American Standard Code for Information Interchange (ASCII) data file. Data collected by data loggers 215 through 216 operate continuously to make real-time data available to processor 230 from sensors 180–181 through 205–206 in about 1-minute time increments.

Weather radar 145 sends radar signals and collects radar reflectivity data on a beam-by-beam basis. Preprocessor 220 re-samples the data into Cartesian grids for each Plan Position Indicator (PPI) scan of a specific elevation. The cartesianized radar data is recorded by preprocessor 220 with a date and time stamp that reflects either the time a complete scan was received or the time data from each pulse was received during the scan as the radar antennae rotated. Cartesianized data facilitates generating a plan view, also known as a polar view, in addition to simplifying the generation of an updated view. The plan view is a constant volume view of a specific elevation over target area 100 called a live Cartesian volume that is continually updated to minimize the mean age of the data. The typical mean age of data made available at the completion of an entire scan is about 1–3 minutes maximum. As an alternative to purchasing and operating a weather radar to collect reflectivity data the desired data can be purchased from any party owning and/or operating a weather radar in a region that includes the target area of interest.

Processor 230 is a PC or equivalent computer system compatible with data loggers 215 through 216 and monitoring stations 166–168. Processor 230 is located in processing station 165 and is designed to continuously poll each data logger 215 through 216 and radar preprocessor 220 using a daemon background process to collect updated data from respective ASCII files across target area 100 by way of first communications carrier 150. First communications carrier 150 can be a wire or wireless transmission medium such as radio or telephone transmission mediums using a Transmission Control Protocol/Internet Protocol (TCP/IP) or other suitable protocol. First communications carrier 150 can also be used to transmit information to each sensor in sensor stations 130–139 for purposes including, but not limited to, coordinating sensor initialization and/or calibration procedures for all or any one of the sensors across the sensor grid within target area 100.

Data from each sensor station 130–139 is ingested and processed by processor 230 to generate a liquid equivalent of frozen precipitation, a cumulative precipitation total, and a time derived precipitation rate for each snowgauge in target area 100 as well as for target area 100 as a whole. The total accumulated precipitation and the precipitation rate for target area 100 as a whole is distance weighted to accommodate simultaneous data updates from snow gauges at varying distances throughout target area 100. Snow gauge data may also be smoothed to remove extreme readings produced by an individual snow gauge. Extreme readings for a snow gauge can occur if precipitation builds up on the edge of a snow gauge and the large buildup suddenly falls into the gauge under the precipitation's own weight. Updated mesonet data, otherwise known as meteorological indicators, for temperature, humidity, wind speed and wind direction are processed by processor 230 to generate a present reading for each sensing device individually in target area 100 as well as for the target area 100 as a whole.

Processor 230 transmits by way of the second communications carrier 170, the raw data components necessary for monitoring stations 120, 125, 165, and 166–168 to generate user defined views of the collected data. Users of the frozen precipitation accumulation alert system in an airport situation typically view the collective meteorological data at locations including remote de-icing monitoring stations 120 and 125, the airport managers monitoring station in the processing station 165 of main terminal 161 or other remote terminals 162–164, and any of the additional monitoring stations 166–168. Each monitoring station can generate a custom view of the sensor station data that facilitates at-a-glance viewing necessary for each user to make decisions relating to the need to remove frozen precipitation from objects within target area 100.

Figure 3:
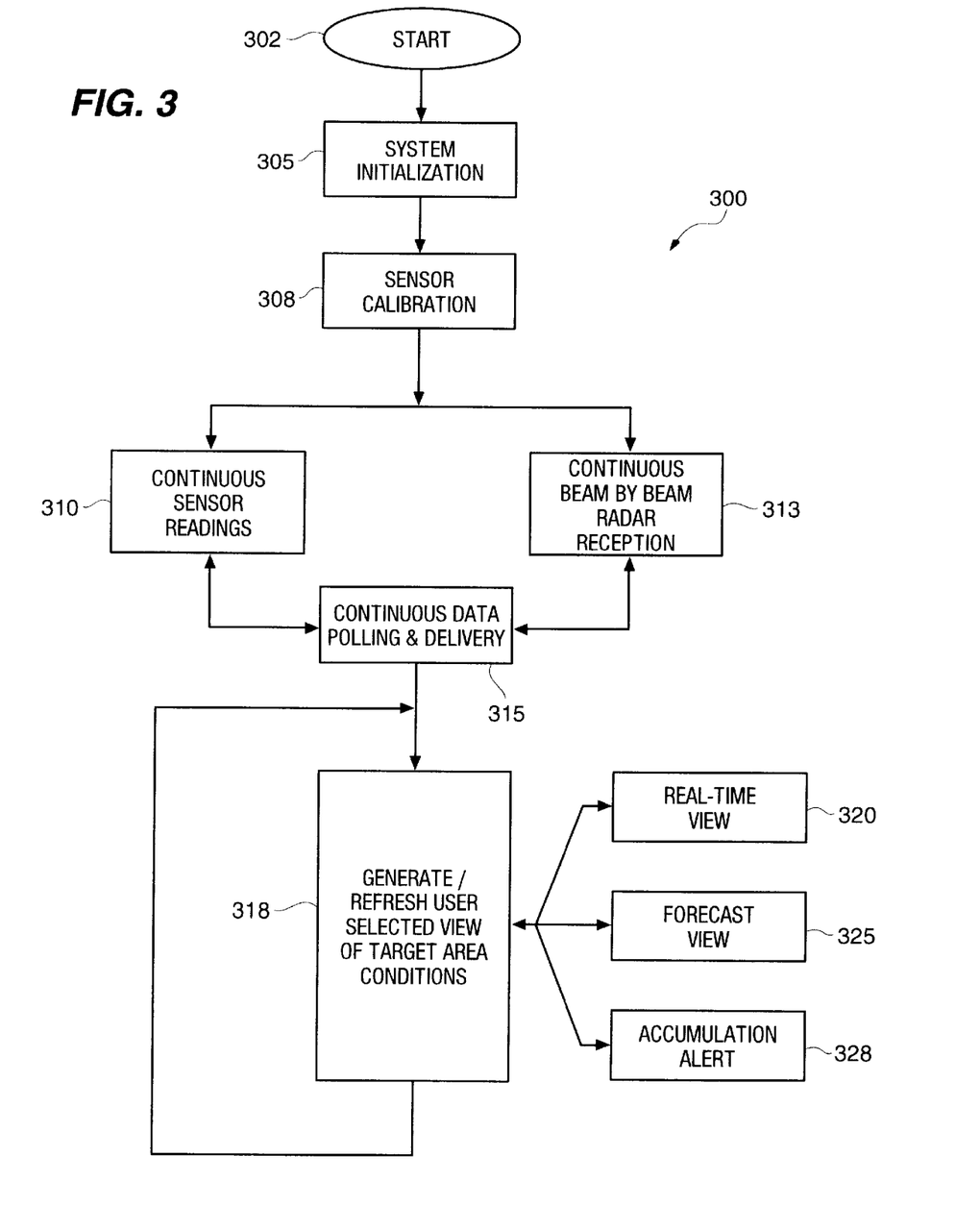
FIG. 3 illustrates the frozen precipitation accumulation alert system operational steps in flow diagram form.

Operational Steps—FIG. 3

FIG. 3 illustrates the operational steps for the frozen precipitation accumulation alert system. The system starts at step 302 and proceeds to system initialization at step 305. System initialization includes, but is not limited to, powering up or otherwise restarting a sensor or other system component to an operational state, either individually or substantially at the same time as other sensors and/or system components. When a sensor and/or component is operational, sensor calibration occurs at step 308. Sensor calibration establishes a baseline sensor reading for like sensors across target area 100 so that like sensors will report data that is accurate relative to all other like sensors across target area 100.

A continuous process begins following the sensor calibration at step 308. At step 310, each sensor in the sensor grid within target area 100 takes continuous and independent meteorological readings of the ambient environment and the data from the meteorological readings is stored by the respective data loggers 215 through 216. Operating substantially concurrently with step 310 is step 313 where weather radar 145 continuously and independently receives radar data reflected from structure in the atmosphere and the radar data is recorded in preprocessor 220. At step 315, processor 230 continuously and independently polls for updated sensor data and radar data collected in steps 310 and 313.

Updated data collected at step 315 due to sensor polling by processor 230 is used by individual monitoring stations across target area 100 to generate user defined views of the data collected from target area 100 at step 318.

The view generated at step 318 is updatable as new data arrives from the continuous sensor polling and radar data collection by processor 230. The view generated at step 318 is user defined and user controlled based on the underlying capabilities provided by standard windows software that is readily available in the commercial PC software industry. A view, meaning a set of data displayed in a screen configuration, can include any individual one or any combination of data in real-time view form at step 320 or in forecast view form at step 325. In either the real-time view form or the forecast view form or some combination thereof, an audible or visual frozen precipitation accumulation alert is generated at step 328 to warn the user of the frozen precipitation accumulation alert system of weather conditions that presently call for removing precipitation or that are expected to require precipitation removal in the future. User defined alert parameters can be manually set or the system can automatically set the alert parameters base on an analysis of past airline takeoff accident weather conditions. In addition, an analysis of past airline takeoff accident weather conditions can take aircraft type and loaded weight into consideration to set alert parameters for specific aircraft types.

Given the types of view available to the user, the details of what data a user chooses to view and in what specific screen configuration the data is viewed are subject to the user's needs. User control over screen configuration is designed with three guiding principles in mind including: 1) providing the user with simple controls to arrange any specific screen configuration; 2) providing the user with maximum information at a glance; and 3) providing information that does not require special meteorological knowledge or at most requires minimal training to interpret because the alert system is designed to automatically notify the user when dangerous conditions presently exist or are likely to exist at some time in the future.

Any user selected view can be altered by further user selection as desired by the user. Thus the view flexibility accommodates needs and interests of a variety of user perspectives from individual ground crews to air traffic controllers. For example, airport personnel need to know both the recent precipitation accumulation, present precipitation rate, and projected accumulation in the next 0–30 minutes to coordinate removing the precipitation accumulation from runways and de-icing and/or anti-icing operations. More importantly than determining precipitation accumulation, however, the frozen precipitation accumulation alert system determines the liquid equivalent of accumulated frozen precipitation which provides the most accurate information needed to determine the need to remove frozen precipitation from aircraft and/or runways.

Figure 4:
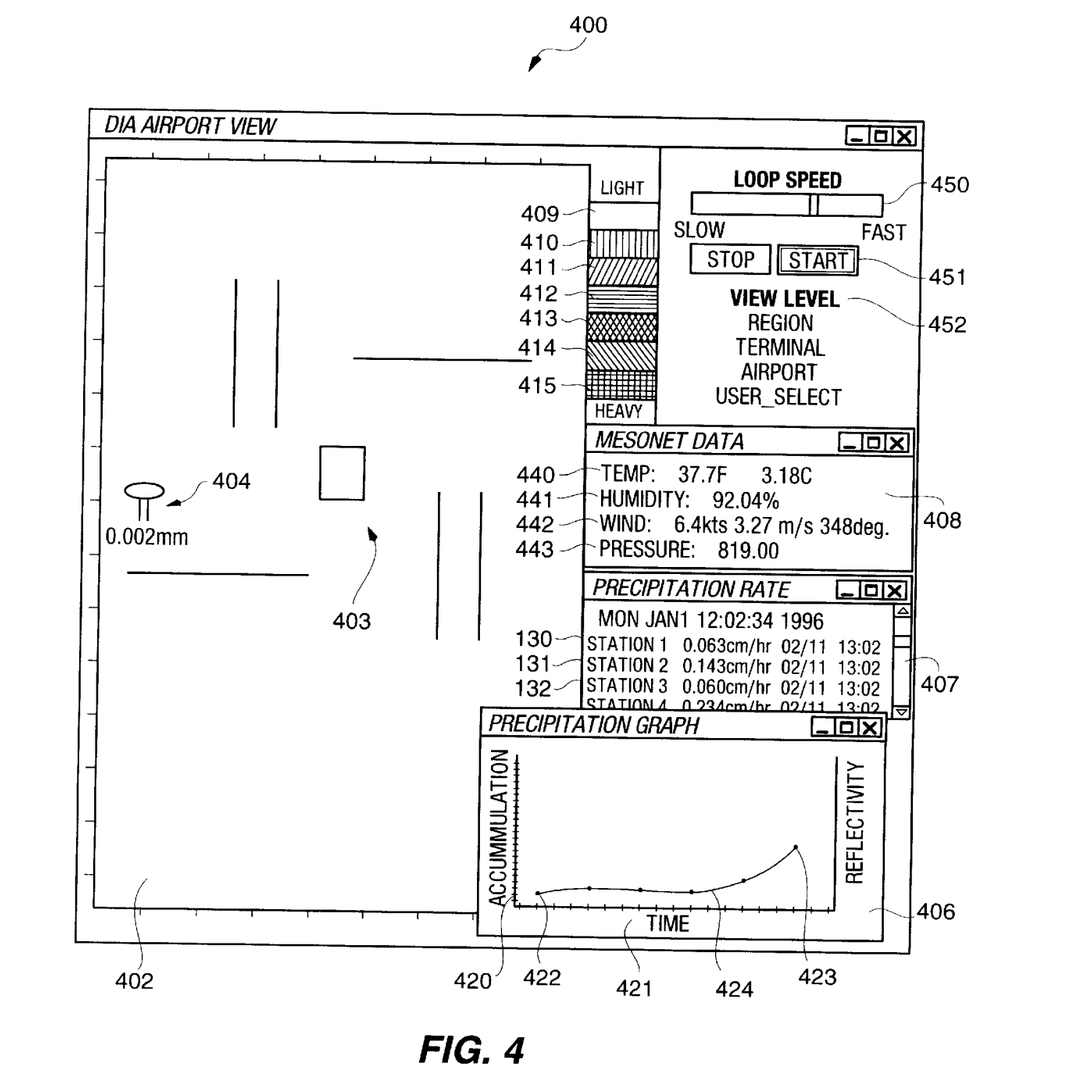
FIG. 4 illustrates a user selectable view example in block diagram form.

User Selectable View—FIG. 4

FIG. 4 illustrates a user selectable view example 400 in block diagram form. The view example 400 includes a primary view 402 with secondary views 406–408. The administration and setup for the type and location of the primary and secondary views, are user defined and selectable by standard pointer device menu selection and window sizing techniques known and available in the industry. The user can define the primary and secondary views to satisfy the type of information needed for their duties at their location.

Primary view 402 includes a multiple grid data view of present and forecast reflectivity data that can range in time anywhere from about 30 minutes past to about 30 minutes future. The multiple grid data view is color coded to indicate various precipitation rates across target area 100 using rate indicators 409–415. Precipitation rate indicators 409–415 illustrate a visual precipitation rate range from light 409 to heavy 415 precipitation. Audio and/or visual alert indicators are generated in response to the precipitation rate indicators.

Geographic reference overlay 403 show the airport terminal area and runways on top of the grid data. Snow gauge icon 404 can also overlay primary view 402 to show sensor locations and individual real-time precipitation rates at each location. Primary view 402 can also be overlaid by other data including, but not limited to, storm motion vectors, temperature variations, precipitation rates for selected snow gauges, and wind vectors.

Users of primary view 402 can select between three preset spatial domains also known as zoom levels or view levels 452. Selecting a view level 452 zooms into or away from selected areas within or surrounding target area 100. Start/stop control 451 starts and stops the access and/or display of reflectivity data. Loop speed control 450 increases and decreases the time delay in which primary view 402 is updated. Additional information that a user can add by administration and setup to their primary view 402 includes, but is not limited to, displaying real-time wind barbs indicative of wind direction and speed across target area 100.

Secondary view 405 is a graphic illustration of a precipitation graph 406 having a precipitation accumulation and reflectivity axis 420 relative to a time axis 421. The data plotted on graph 406 ranges from a start time 422 to a future time 423 with the present time 424 in between. Time on the graph can be color coded to show age of the data. The graph 406 shows a precipitation accumulation at a specific point in target area 100. The specific point in target area 100 is selected by a user delivering a cursor command in primary view 402. A cursor command is typically delivered by manually positioning a movable cursor in the desired location on primary view 402 and activating a switch on a cursor control device in a manner well known in the PC computing industry. By delivering a cursor command in the immediate area of a snow gauge such as snow gauge 404 in primary view 402 the precipitation graph 406 will display accumulation data from snow gauge 404. By delivering a cursor command in an area of primary view 402 that is a configurable distance from any snow gauge, precipitation graph 406 will display the lowest elevational planes of radar data from weather radar 145 as the basis for the plot. The precipitation graph 406 can be used to determine the total precipitation accumulation on an aircraft that is near a specific snow gauge for a period of time.

Secondary view 407 is a text graphic illustration of a precipitation rate as recorded in real time by each sensing station 130–139. Each line in secondary view 407 is a specific sensing station 130–139 that is updated individually as new real-time data is available from each individual sensing station.

Secondary view 408 is a text graphic illustration of average mesonet data from sensing stations 130–139 across target area 100. The data includes average temperature 440 in degrees Fahrenheit and Celsius, average humidity 441 in percent, average wind speed and direction 442 in knots, meter/second, and degrees, and average atmospheric pressure 443.

Additional types of secondary views include, but are not limited to, a time series plot that illustrates the change in precipitation accumulation or general weather conditions for all or any one of the sensor locations, and a real-time text based view of the most recent NWS observations of the target area and vicinity.

Summary

The frozen precipitation accumulation alert system of the present invention includes a means and apparatus for measuring real-time meteorological indicators, determining liquid equivalent precipitation rates for present and future precipitation, and generating a view of precipitation data for a user. Although specific embodiments are disclosed herein, it is expected that persons skilled in the art can and will design alternative database view generation systems that are within the scope of the following claims either literally or under the Doctrine of Equivalents.

What is claimed is:

1. A frozen precipitation accumulation alert system for a target area, said system comprising:

means for measuring at least one meteorological indicator in at least one measurement location proximate to said target area;

means for detecting meteorological structure using radar data from a weather radar over a region that includes said target area; and means for determining a precipitation accumulation forecast based on said meteorological structure and said at least one meteorological indicator.

2. A system according to claim 1 wherein said means for measuring includes:

means for quantifying a precipitation rate of frozen precipitation over time wherein said precipitation rate is one of said at least one meteorological indicator.

3. A system according to claim 2 wherein said means for quantifying a precipitation rate includes:

means for accumulating said frozen precipitation with a snow gauge; and means for quantifying a liquid equivalent of said accumulation of said frozen precipitation wherein said means for quantifying occurs in at least one time frame selected from the group comprised of: continuously in real time, and periodically.

4. A system according to claim 2 wherein said means for measuring includes:

means for quantifying a plurality of meteorological indicators selected from the group consisting of: a precipitation rate of frozen precipitation over time, atmospheric pressure, ambient surface temperature, humidity, surface wind speed, and surface wind direction.

5. A system according to claim 1 wherein said means for determining a precipitation accumulation forecast includes:

means for determining a frozen precipitation accumulation likelihood based on said at least one meteorological indicator and said radar data indicative of said meteorological structure;

means for determining a present need to remove frozen precipitation from an object within said target area based on said present precipitation rate; and means for determining a future need to remove frozen precipitation from an object within said target area based on said frozen precipitation accumulation likelihood.

6. A system according to claim 1 including:

means for generating a view in human readable graphic form indicative of said target area and user selected ones of said at least one meteorological indicator, said meteorological structure, said frozen precipitation accumulation forecast; and means for generating a sensory stimulus to alert a human user of said frozen precipitation alert system of reaching a predefined alert parameter.

7. A system according to claim 6 wherein said means for generating said view includes:

means for generating a primary view based on gridded precipitation data; and means for generating at least one secondary view of user selected ones of said at least one meteorological indicator, said meteorological structure, and said surface accumulation forecast.

8. A system according to claim 7 wherein said primary view includes:

means for generating said primary view based on a user selected view perspective of said target area selected from a group consisting of: a plan view, a geometric view, a cross sectional elevation view, and a polar coordinate view.

9. A system according to claim 7 wherein said means for generating includes:

means for generating said primary view concurrently with at least one overlay view of user selected ones of said at least one meteorological indicator, said meteorological structure, and said surface accumulation forecast.

10. A frozen precipitation accumulation alert system for a target area, said system comprising:

means for quantifying one of a plurality of meteorological indicators that is a liquid equivalent of an accumulation of frozen precipitation over time in at least one location proximate to said target area;

means for quantifying additional ones of said plurality of meteorological indicators including atmospheric pressure, temperature, humidity, surface wind speed, and surface wind direction concurrently with said means for quantifying said liquid equivalent of said accumulation of frozen precipitation over time;

means for detecting meteorological structure by radar data from a meteorological radar over a region that includes said target area;

means for determining a surface accumulation forecast based on said at least one meteorological indicator and said meteorological structure;

means for determining a surface accumulation alert based on said surface accumulation forecast; and means for generating a primary view of cartesianized radar data concurrently with a plurality of user selectable secondary views of said plurality of meteorological indicators.

11. A method of using a frozen precipitation accumulation alert system for a target area, said method comprising:

measuring at least one meteorological indicator in at least one measurement location proximate to said target area;

detecting meteorological structure using radar data from a weather radar over a region that includes said target area; and determining a precipitation accumulation forecast based on said meteorological structure and said at least one meteorological indicator.

12. A method according to claim 11 wherein said step of measuring includes:

quantifying a precipitation rate of frozen precipitation over time wherein said precipitation rate is one of said at least one meteorological indicator.

13. A method according to claim 12 wherein said step of quantifying a precipitation rate includes:

accumulating said frozen precipitation with a snow gauge; and quantifying a liquid equivalent of said accumulation of said frozen precipitation wherein said means for quantifying occurs in at least one time frame selected from the group comprised of: continuously in real time, and periodically.

14. A method according to claim 12 wherein said step of measuring includes:

quantifying a plurality of meteorological indicators selected from the group consisting of: a precipitation rate of frozen precipitation over time, atmospheric pressure, ambient surface temperature, humidity, surface wind speed, and surface wind direction.

15. A method according to claim 11 wherein said step of determining a precipitation accumulation forecast includes:

determining a frozen precipitation accumulation likelihood based on said at least one meteorological indicator and said radar data indicative of said meteorological structure;

determining a present need to remove frozen precipitation from an object within said target area based on said present precipitation rate; and determining a future need to remove frozen precipitation from an object within said target area based on said frozen precipitation accumulation likelihood.

16. A method according to claim 11 including:

generating a view in human readable graphic form indicative of said target area and user selected ones of said at least one meteorological indicator, said meteorological structure, said frozen precipitation accumulation forecast; and generating a sensory stimulus to alert a human user of said frozen precipitation alert system of reaching a predefined alert parameter.

17. A method according to claim 16 wherein said step of generating said view includes:

generating a primary view based on gridded precipitation data; and generating at least one secondary view of user selected ones of said at least one meteorological indicator, said meteorological structure, and said surface accumulation forecast.

18. A method according to claim 17 wherein said primary view includes:

generating said primary view based on a user selected view perspective of said target area selected from a group consisting of: a plan view, a geometric view, a cross sectional elevation view, and a polar coordinate view.

19. A method according to claim 17 wherein said step of generating includes:

generating said primary view concurrently with at least one overlay view of user selected ones of said at least one meteorological indicator, said meteorological structure, and said surface accumulation forecast.

20. A method for using a frozen precipitation accumulation alert system for a target area, said method comprising:

quantifying one of a plurality of meteorological indicators that is a liquid equivalent of an accumulation of frozen precipitation over time in at least one location proximate to said target area;

quantifying additional ones of said plurality of meteorological indicators including atmospheric pressure, temperature, humidity, surface wind speed, and surface wind direction concurrently with said means for quantifying said liquid equivalent of said accumulation of frozen precipitation over time;

detecting meteorological structure by radar data from a meteorological radar over a region that includes said target area;

determining a surface accumulation forecast based on said at least one meteorological indicator and said meteorological structure;

determining a surface accumulation alert based on said surface accumulation forecast; and generating a primary view of cartesianized radar data concurrently with a plurality of user selectable secondary views of said plurality of meteorological indicators.

21. A program storage device readable by a computer, tangibly embodying instructions executable by said computer to perform method steps for a frozen precipitation accumulation alert system for a target area, said method comprising:

quantifying one of a plurality of meteorological indicators that is a liquid equivalent of an accumulation of frozen precipitation over time in at least one location proximate to said target area;

quantifying additional ones of said plurality of meteorological indicators including atmospheric pressure, temperature, humidity, surface wind speed, and surface wind direction concurrently with said means for quantifying said liquid equivalent of said accumulation of frozen precipitation over time;

detecting meteorological structure by radar data from a meteorological radar over a region that includes said target area;

determining a surface accumulation forecast based on said at least one meteorological indicator and said meteorological structure;

determining a surface accumulation alert based on said surface accumulation forecast; and generating a primary view of cartesianized radar data concurrently with a plurality of user selectable secondary views of said plurality of meteorological indicators.

22. A method according to claim 21 including:

generating a view in human readable graphic form indicative of said target area and user selected ones of said at least one meteorological indicator, said meteorological structure, said frozen precipitation accumulation forecast; and generating a sensory stimulus to alert a human user of said frozen precipitation alert system of reaching a predefined alert parameter.

23. A method according to claim 21 including:

generating a primary view based on gridded precipitation data; and generating at least one secondary view of user selected ones of said at least one meteorological indicator, said meteorological structure, and said surface accumulation forecast.

24. A method according to claim 23 wherein said primary view includes:

generating said primary view based on a user selected view perspective of said target area selected from a group consisting of: a plan view, a geometric view, a cross sectional elevation view, and a polar coordinate view.

25. A method according to claim 23 wherein said step of generating includes:

generating said primary view concurrently with at least one overlay view of user selected ones of said at least one meteorological indicator, said meteorological structure, and said surface accumulation forecast.

* * * * *